United States Patent
Liu et al.

(10) Patent No.: US 8,165,395 B2
(45) Date of Patent: Apr. 24, 2012

(54) AUTOMATIC IMAGE COLOR TONE CORRECTION

(75) Inventors: Ming-Chang Liu, San Jose, CA (US); Gazi Ali, San Jase, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1031 days.

(21) Appl. No.: 12/103,490

(22) Filed: Apr. 15, 2008

(65) Prior Publication Data
US 2009/0257652 A1 Oct. 15, 2009

(51) Int. Cl.
*G06K 9/00* (2006.01)

(52) U.S. Cl. .......... 382/167; 382/162; 382/169

(58) Field of Classification Search .......... 382/162, 382/167, 169, 255; 348/231.3; 358/1.9, 358/1.18, 504, 1.12, 1.14, 3.24, 3.27; 345/629, 345/1.1, 1.2

See application file for complete search history.

(56) References Cited

U.S. PATENT DOCUMENTS

| 5,687,011 | A | 11/1997 | Mowry |
| 6,594,388 | B1 | 7/2003 | Gindele et al. |
| 6,661,425 | B1 * | 12/2003 | Hiroaki .................. 345/629 |

FOREIGN PATENT DOCUMENTS
JP 2003270164 A * 9/2003
* cited by examiner

*Primary Examiner* — Anh Hong Do
(74) *Attorney, Agent, or Firm* — John P. O'Banion (57) ABSTRACT

A method of image color tone correction is disclosed, which may include the steps of (a) providing a reference image and one or more source images, wherein all images are comprised of pixels of a scene; (b) correcting a designated portion of one of the source images based on the reference image to create a color tone corrected image; and (c) outputting the color tone corrected image to a computer readable medium. The designated portion may be any subset of one of the source images, and may be a simple cropping, interlace, or other form of selection, such as areas of interest in the scene. Additionally, the designated portion may be used for determining a set of coefficients for overall color image correction of the complement of the source images. This method brings the increased tonal and saturation qualities of still images to those in motion.

22 Claims, 10 Drawing Sheets

AUTOMATIC IMAGE COLOR TONE CORRECTION

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention generally relates to image color tone correction and more particularly to image color tone correction of video image streams corrected to reference still images of similar scenic content.

2. Description of Related Art

Still cameras typically have optimized processing parameters that result in beautiful, deeply saturated, colorful images.

Video recorders, due to the need to very quickly acquire and process video frames, must make compromises with modified processing parameters. These compromises frequently result in desaturated video frames, and colors that appear "off" from both a still camera, and direct viewing of a scene.

When still cameras are used for recording video, similar processing parameter tradeoffs are required, with the same reduction in picture quality of the acquired video frames.

BRIEF SUMMARY OF THE INVENTION

An aspect of the invention is a method of image color tone correction, which may comprise: (a) providing a reference image and one or more source images, wherein all images are comprised of pixels of a scene; (b) correcting a designated portion of one of the source images based on the reference image to create a color tone corrected image; and (c) outputting the color tone corrected image to a computer readable medium. The designated portion may be any subset of one of the source images, and may be a simple cropping, or other form of selection. Additionally, the designated portion may be used for determining a set of coefficients for overall color image correction of the complement of the source images.

The color correction may occur in any color space. However, as the YUV is frequently used in video processing, it will be used here as an example, without limitation. Alternative color spaces with robust gamuts may be used as well. In the following descriptions, YUV is merely indicative of one color space that may be used, and not indicative of a limitation.

The correcting step may comprise: (a) forming an intermediate image from the designated portion of one of the source images using a global correction in a YUV color space; and (b) refining the intermediate image into the color tone corrected image. Alternatively, steps (a) and (b) can be combined into one step. If separated into two steps, the mapping function of step (a) can be realized in advance as a look up table.

Typically, the designated portion of one of the source images corresponds to the same scenic content as that found in the reference image.

The method of forming the intermediate image step may comprise: (a) mapping a source pixel Y value, $Y_{source}$, from the designated portion of one of the source images, to an intermediate Y value, $Y_{int}$, in the intermediate image; (b) mapping a source U pixel value, $U_{source}$, from the source image to be corrected, to an intermediate pixel U value, $U_{int}$, in the intermediate image; and (c) mapping a source pixel V value, $V_{source}$, from the source image to be corrected, to an intermediate pixel V value, $V_{int}$, in the intermediate image. These mappings may be performed independently, or in parallel for either all or just those pixels located in the designated portion of one of the source images. Further, the mappings may be performed sequentially in any order, for example, with each of the pixel values processed with the source pixel Y value, then all of the U pixel values, then all of the V pixel values.

The mapping of the source image pixel YUV value to the intermediate image pixel YUV value may comprise: providing independent Y, U, and V look up tables (LUTs) that allow mapping of a source pixel YUV value, ($Y_{source}$, $U_{source}$, $V_{source}$), from the designated portion of one of the source images, to a corresponding intermediate pixel YUV value, ($Y_{int}$, $U_{int}$, $V_{int}$), in the intermediate image; wherein the independent Y, U, and V look up tables (LUTs) are comprised of nominal mapping values.

The independent Y, U, and V look up tables (LUTs) may be determined from hardware characterization experiments, where, for specific lighting conditions and specific processing parameters, there is an optimal Y, U, and V look up table.

The independent Y, U, and V look up tables (LUTs) may be generated off-line, without involvement or usage of any data from the reference image or the one or more source images.

Each of the independent Y, U, and V look up tables (LUTs) represents a mapping between: a first set of processing parameters for the reference image, and a second set of processing parameters for the one or more source images. The term "processing parameters" is used here to capture the concept of sensor speed (ISO number), gamma, color correction, lighting, or other parameter that would affect the acquisition of the reference image or the one or more source images.

The mapping of the source pixel YUV value to the intermediate YUV value may comprise: (a) calculating independent Y, U, and V look up tables (LUTs) that map the source pixel YUV value, ($Y_{source}$, $U_{source}$, $V_{source}$), from the source image to be corrected, to a corresponding intermediate pixel YUV value, ($Y_{int}$, $U_{int}$, $V_{int}$), in the intermediate image; (b) wherein the independent Y look up table (LUT) may comprise: a curve fitted Cumulative Distribution Function (CDF) based on histograms of the source image and the reference image; (c) wherein the independent U, and V look up tables (LUTs) are comprised of mean-value mapping values. In this embodiment, the independent Y, U, and V look up tables (LUTs) may be comprised of mean-value mapping values when the nominal map is not available and/or CDF matching is too computationally expensive.

The curve fitted Cumulative Distribution Function (CDF) may be curve fit with a cubic polynomial for a low, mid, and high range of data. Ideally, these three polynomials substantially overlap with the same or very close functional outputs for the same data input. The three cubic polynomials may also form cubic splines, thereby guaranteeing overlap and continuity of slope. The curve fit procedure may exclude noisy outlier data at the extremes of the data.

Similarly, other curve fit methods may be used, as well known in the numerical analysis community.

The mapping of the source pixel YUV value to the intermediate pixel YUV value may comprise: calculating independent Y, U, and V look up tables (LUTs) that map the source pixel YUV value, ($Y_{source}$, $U_{source}$, $V_{source}$), from the source image to be corrected, to a corresponding intermediate pixel U value, ($Y_{int}$, $U_{int}$, $V_{int}$), in the intermediate image; wherein the independent Y, U, and V look up tables (LUTs) are comprised of mean-value mapping value based on the designated portion of one of the source images, and a corresponding designated portion of the reference image.

It is to be understood that the intermediate image may never be visualized, and may only exist as pixel values ($Y_{int}$, $U_{int}$, $V_{int}$) within a computer readable medium, most likely a computer or video processor.

The refining of the intermediate image into the color tone corrected image step may comprise: (a) matching a color tone of the intermediate image to a color tone of the reference image; (b) wherein the color tone of the intermediate image is comprised of the Y, U, and V values of the pixels of the intermediate image, ($Y_{int}$, $U_{int}$, $V_{int}$); and (c) wherein the color tone of the reference image is comprised of the Y, U, and V values of the pixels of the reference image, ($Y_{ref}$, $U_{ref}$, $V_{ref}$). This process uses co-located pixels, that is, the intermediate image is an image of the scene, and the reference image is also an image of the scene, such that a co-located pixel in both represents the same pixel of information in the scene, despite being in both the intermediate and reference images. This remains true, even if a subset of a single source image is to be processed.

The method of matching the color tone of the intermediate image to the color tone of the reference image step may comprise: (a) regressing the color tone of the intermediate image with the color tone of the reference image to form color tone correction parameters $a_{i,j}$, where i ,j ∈ [Y, U, V]; (b) wherein the regressing step minimizes a least squares error; and c) applying the color tone correction parameters $a_{i,j}$ to the intermediate image to form the color tone corrected image.

While least squares error is among the lowest computational burden method of regression, other error bounds and solution methods may also be used. However, the least squares error solution routine typically is included with readily available computer software mathematics solution packages, thereby minimizing development time on this particular matrix regression solution.

The subset of the reference image color tone and the subset of the intermediate image may comprise an interlaced subset.

The regressing step may comprise: a) using a subset of the reference image color tone and a corresponding subset of the intermediate image to form color tone correction parameters $a_{i,j}$, where i ,j ∈ [Y, U, V]; b) whereby the computational loading for calculating the color tone correction parameters $a_{i,j}$ is substantially reduced. The method of image color tone correction may further comprise: applying the color tone correction parameters $a_{i,j}$, where i ,j ∈ [Y, U, V], to the intermediate images of the remainder of the source images from the same scene to form the color tone corrected images. This applying step is a simple matrix multiplication of the intermediate image times the color tone correction parameters $a_{i,j}$.

Another aspect of the invention is a computer readable medium comprising a programming executable capable of performing on a computer the methods discussed above.

Further, an image color tone correction apparatus may be constructed that comprises the methods described above. The resultant image color tone correction apparatus may be hand held. Or, rather, data acquisition of the reference and source images may be hand held, and then post processed on more capable hardware that may not be hand held.

A still further aspect of the invention is a method of image color tone correction, which may comprise: (a) acquiring a still reference image of a scene, wherein the still reference image is comprised of pixels; (b) acquiring one or more source images of the scene, wherein the source images are comprised of pixels; (c) correcting a designated portion of one of the source images based on a corresponding portion of the reference image to create a color tone corrected image; and (d) outputting the color tone corrected image to a computer readable medium. This method allows for the correction of a portion of one or more of the source images to be selectively applied, much like a selected portion of a graphic image in photographic editing software.

A computer readable medium comprising a programming executable capable of performing on a computer the selective method of image color tone correction discussed above.

In another aspect of the invention, the method of image color tone correction may comprise: (a) detecting a change in the scene; and (b) after detecting the change in the scene, acquiring a new reference image to replace the reference image. This concept is similar to video broadcasting, where, at the beginning of a group of pictures (GOP), a full image is used, except here, when the scene changes, a new reference image is acquired.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus generally shown in FIG. 1 through FIG. 9B. It will be appreciated that the apparatus may vary as to configuration and as to details of the parts, and that the method may vary as to the specific steps and sequence, without departing from the basic concepts as disclosed herein.

Definitions

"YUV" is an acronym for the color space known by Y=Luminance, U=Normalized B-Y, V=Normalized R-Y. The YUV model defines a color space in terms of one luma and two chrominance components.

YUV signals are created from an original RGB (red, green, and blue) source. The weighted values of R, G, and B are added together to produce a single Y signal, representing the overall brightness, or luminance, of that spot. The U signal is then created by subtracting the Y from the blue signal of the original RGB, and then scaling; V is created by subtracting the Y from the red, and then scaling by a different factor. This can be accomplished easily with analog circuitry.

The methods and apparatus of the invention described herein may be applicable on any known color space. The reason it is used in this patent application is that YUV is a common color space in conventional digital image/video capturing devices. "Video image" means a collection of frames of images typically obtained with a video recorder. Such video image may also be referred to as a video image stream.

"Still image" means a single image that is not normally part of a video image. Still image may also be referred to as a still picture.

"Computer" means any device capable of performing the steps, methods, or producing signals as described herein, including but not limited to: a microprocessor, a microcontroller, a video processor, a digital state machine, a field programmable gate array (FPGA), a digital signal processor, a collocated integrated memory system with microprocessor and analog or digital output device, a distributed memory system with microprocessor and analog or digital output device connected by digital or analog signal protocols.

"Computer readable medium" means any source of organized information that may be processed by a computer to perform the steps described herein to result in, store, perform logical operations upon, or transmit, a flow or a signal flow, including but not limited to: random access memory (RAM), read only memory (ROM), a magnetically readable storage system; optically readable storage media such as punch cards or printed matter readable by direct methods or methods of optical character recognition; other optical storage media such as a compact disc (CD), a digital versatile disc (DVD), a rewritable CD and/or DVD; electrically readable media such as programmable read only memories (EEPROMs), field programmable gate arrays (FPGAs), flash random access memory (flash RAM); and information transmitted by electromagnetic or optical methods including, but not limited to , wireless transmission, copper wires, and optical fibers.

1.0 Introduction

One aspect of this invention provides algorithms of color tone correction to match the colors of one image to the colors of another image with a similar scene. The colors that comprise an image are frequently referred to as the tonality of the image.

Another aspect of this invention is designed to match the color tone of video images with associated still picture images taken from the same, similar, or even different image sensors. The algorithms described here may also be applicable for chrominance adjustment for other applications, such as photomontages.

Video images generally do not look as vivid and colorful as still picture images. Even though a scene is captured by the same sensor (e.g., CMOS) for both still picture and video image streams an image obtained from video will not have the same color tone as the still picture image due to process variations between the initial captured raw data to the final output image data. These process variations may include: different gamma values, dynamic range adjustments, image enhancements, sensor sensitivity (ISO sensitivity numbers), exposure time, illumination, or other parameters.

The invention here systematically determines a set of mapping functions between video images and corresponding still pictures. Once the mapping functions are determined, they are used to adjust the color tonal values of the input video images so that they match the colors (saturation and luminosity) of a reference still picture that has a similar scene. This method thereby imbues video images with the tonal qualities and saturation of still images, thereby greatly enhancing the perceived video image quality.

The method disclosed here accurately transforms the color tone of one image (generally from a video image stream) to be the same as another one (generally from a still image). Although this invention describes the algorithm only from the standpoint of improving video images by using reference still images, one may readily extend the algorithm to other related applications.

To aid in the description of the algorithms used here, still pictures will be referred to as references, an associated video image stream for correction as source, and the corrected video image stream as the mapped (or corrected) image stream.

2.0 Method

Figure 1:
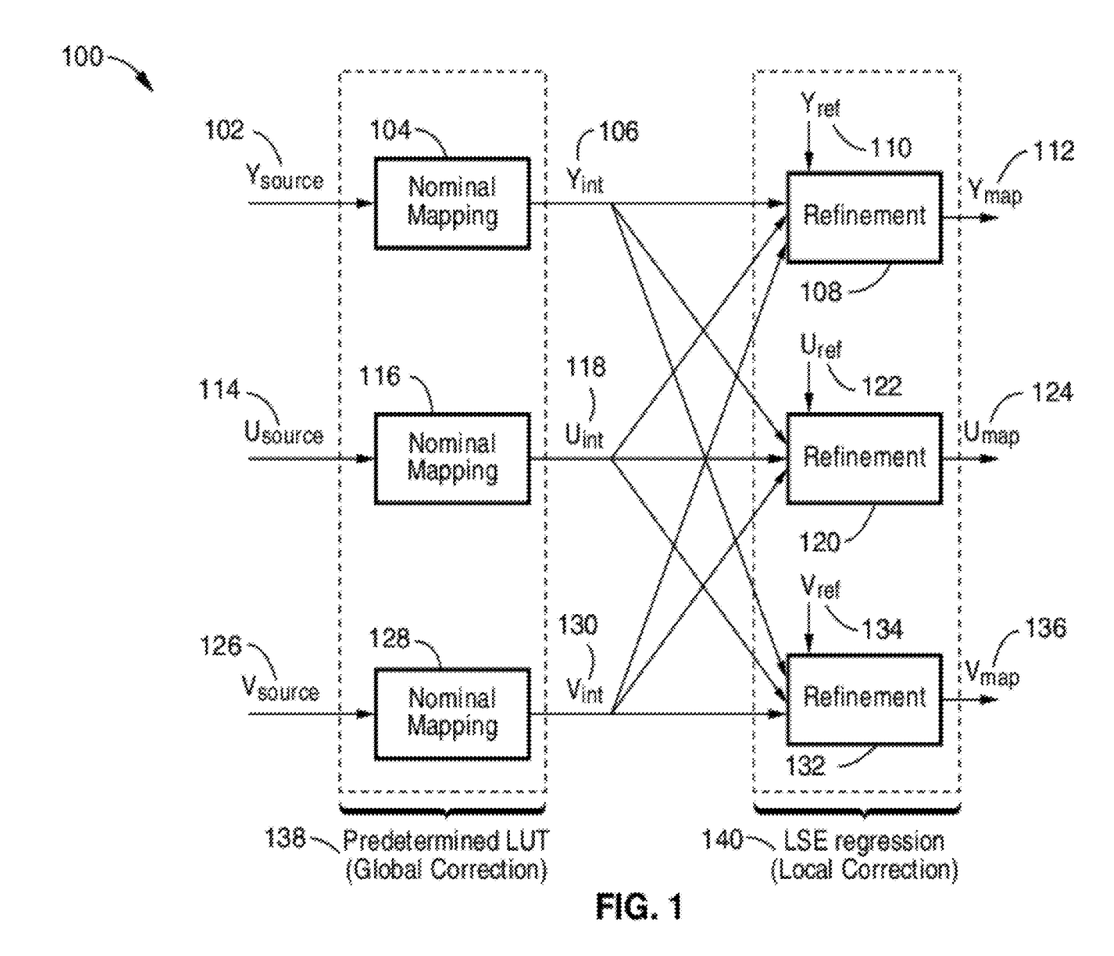
FIG. 1 is a flow chart showing an automatic color tone correction method using nominal mapping for the initial color correction.

Refer now to FIG. 1. To achieve accurate color conformance between two images, a two-step approach is described. Additionally, the original YUV color space is used to avoid additional color space transformations and any limitations (such as out of gamut problems) or transcription errors that may result in the use of such color space transformations.

FIG. 1 is a flow chart showing an automatic color tone correction method 100 using nominal mapping. Here, the three color components from source image are first processed through nominal mapping independently with pre-determined mapping functions. These intermediate data are then used as inputs for the refinement. Each final output channel is determined by all three channels to ensure the final colors appearance at the refinement stage.

In greater detail, the source luminance $Y_{source}$ 102 proceeds to a nominal mapping process 104 to generate an intermediate luminance $Y_{int}$ 106 value. This value is in turn processed through a refinement stage 108 with a reference input luminance $Y_{ref}$ 110 to produce a mapped luminance $Y_{map}$ 112. The other inputs to the refinement step 108 will be deferred in the description at this time.

Similarly, the source U value $U_{source}$ 114 is used as an input to a nominal mapping process 116 to generate an intermediate U value $U_{int}$ 118 value. This value is in turn processed through a refinement stage 120 with a reference input U value $U_{ref}$ 122 to produce a mapped U value $U_{map}$ 124. As above, other inputs to the refinement step 120 will be deferred in the description for a short time.

Finally, the source V value $V_{source}$ 126 proceeds to a nominal mapping process 128 to generate an intermediate V value $V_{int}$ 130 value. This value is in turn processed through a refinement stage 132 with a reference input V value $V_{ref}$ 134 to produce a mapped V value $V_{map}$ 136.

The description above merely described the processing of the $Y_{source}$ 102, $U_{source}$ 114, and $V_{source}$ 126 with no interaction with each other. Now, the interactions are added in the three refinement stages Y 108, U 120, and V 132.

The refinement stage 108 additionally inputs $U_{int}$ 118 and $V_{int}$ 130 in the formation of the $Y_{map}$ 112 output value.

Similarly, the refinement stage 120 additionally inputs $Y_{int}$ 106 and $V_{int}$ 130 in the formation of the $U_{map}$ 124 output value.

Finally, the refinement stage 132 additionally inputs $Y_{int}$ 106 and $U_{int}$ 118 in the formation of the $V_{map}$ 136 output value.

2.1 Nominal Mapping

The idea of nominal mapping as a first step is to work as a global color correction to bring the color tones of two images closer together, which is a preparatory stage for the subsequent refinement stage. The nominal mapping function is independent to the image contents but is likely dependent on each particular image capturing device. It can be pre-determined or determined on the fly.

The nominal mappings of the $Y_{source}$ 102, $U_{source}$ 114, and $V_{source}$ 126 occur in blocks 104, 116, and 128 in a predetermined look up table (LUT) to provide an initial global correction 138 to the source input YUV values.

The refinement mappings of the $Y_{int}$ 106, $U_{int}$ 118, and $V_{int}$ 130 occur in blocks 108, 120, and 132 using LSE regression to provide a local correction 140 to the source intermediate YUV values.

Nominal Mapping Function

To form a nominal mapping function, a pair of images from a still picture and an associated video frame (with the same scene) are used.

Figure 2:
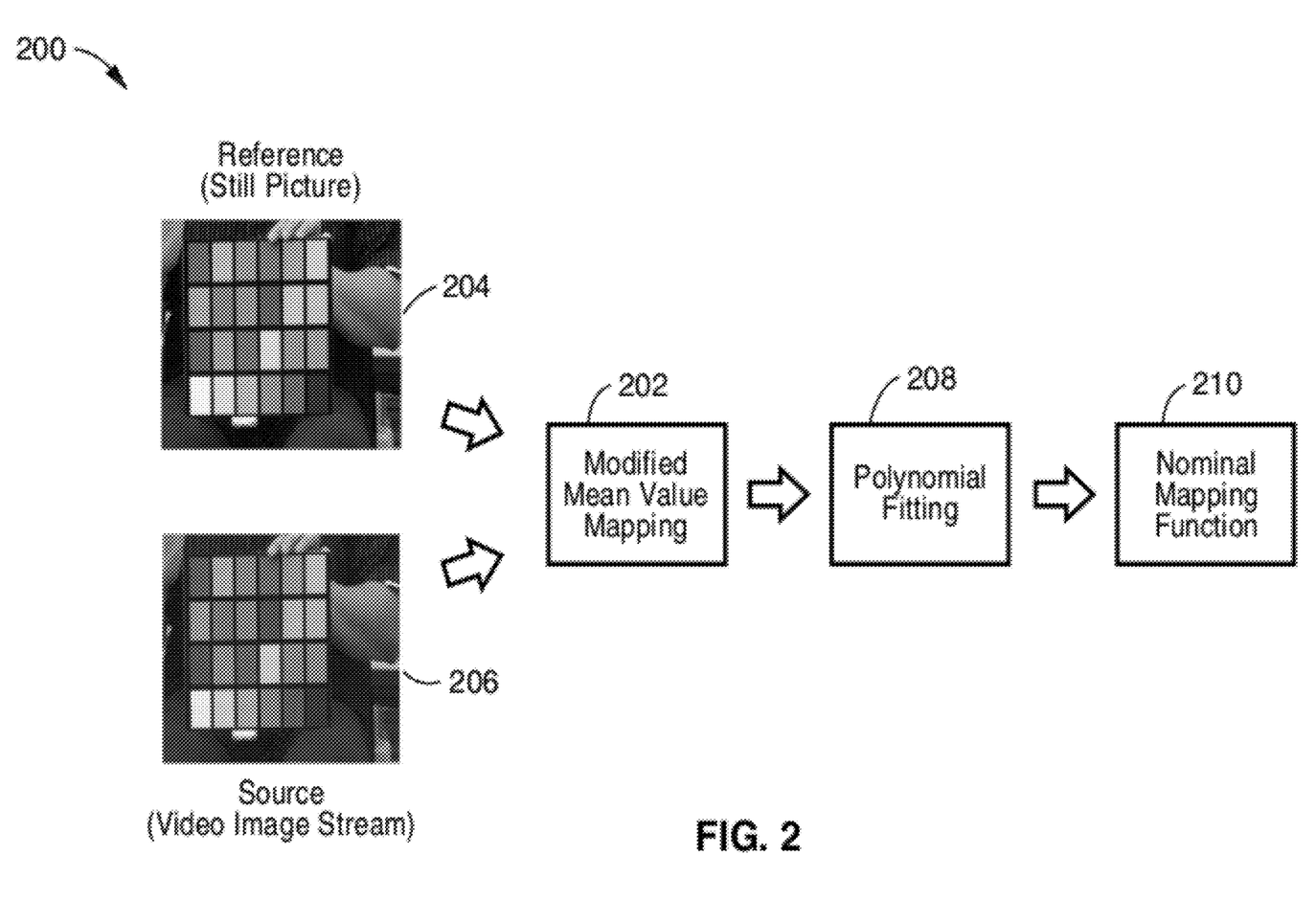
FIG. 2 is a proposed method of constructing a nominal mapping function used in the automatic color tone correction method of FIG. 1.

Refer now to FIG. 2, which shows one proposed method of constructing a mapping function 200. Y, U, and V components are each processed independently at this stage. Here, the images are calibrated with Gretag Macbeth Color-Checker for the determination of nominal mapping function because it contains a wider range of chrominance data. However, images with differing content are also applicable.

Specifically, a modified mean value mapping 202 is determined by using an input reference picture (a still picture) 204, and the same or similar image from a source 206 frame of similar content from the video image stream. The modified mean value mapping 202 output is used as an input into a polynomial fitting section 208, which in turn outputs the nominal mapping function 210.

Ideally, both the reference picture 204 and the source frame 206 contain a wide gamut of color information, such as a Gretag Macbeth Color-Checker chart. Such a chart is developed and calibrated with spectrophotometers, allowing precise and consistent color samples, and typically have a very wide color gamut.

Modified Mean Value Mapping

Figure 3A:
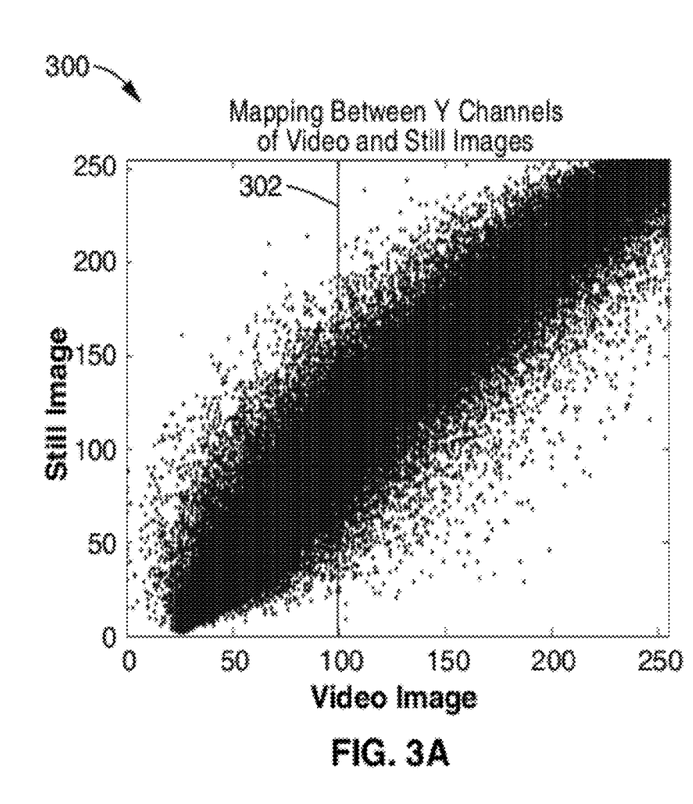
FIG. 3A is an example of a scatter chart of the relationship between a source image (video frame) and a reference image (still picture) on the Y channel.
Figure 3B:
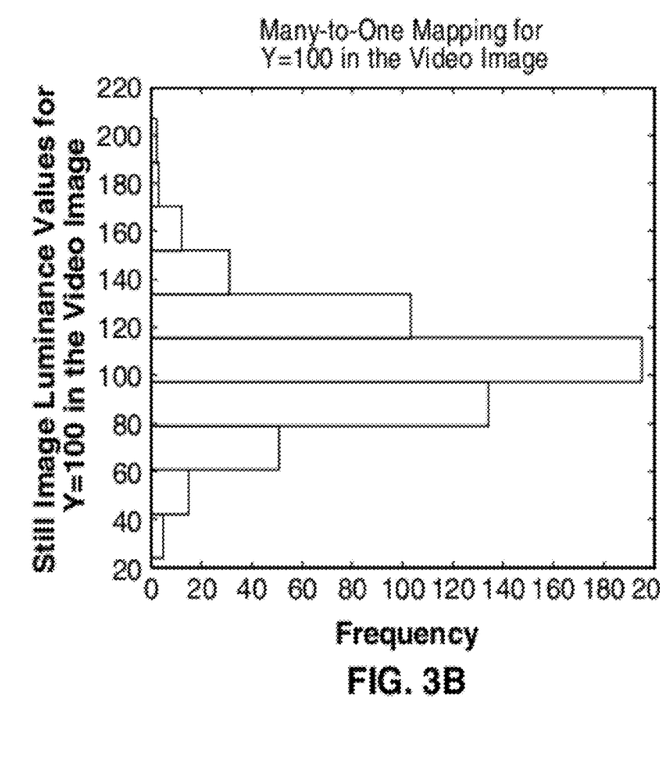
FIG. 3B is an example of a histogram of the video source value at Y=100 and its associated data range.

Refer now to FIGS. 3A and 3B. FIG. 3A shows an example of the relationship between a source image (video frame) and a reference image (still picture) on the Y channel 300. A single value on source image is associated with a wide range of data values on reference image and vice versa. For example, as shown in FIG. 3A, a data value 100 on video image (the vertical line 302 within the graph) is associated with data values between 24 and 207 (with mean value at 103) on the corresponding still picture. FIG. 3B shows the histogram of this associated data range for the video source value at 100. A single value from the associated range needs to be mapped in order to have a one-to-one nominal mapping.

Here the mean value is chosen as the mapped value. This is because the mean value is easy to compute with the assumption that the noise is unbiased. Although using the value with peak distribution is another potential method that could be used, the result is very close to that by average but with a greatly increased computational load. Therefore, in this instance the mean value is used as the mapped value.

With this approach, the mapping functions from different lighting conditions are almost the same among each channel. Similar results are also shown in different models, such as a widely available high definition camcorder. This implies that each camera only needs three mapping functions, with only a single nominal mapping function for each channel.

Figure 4:
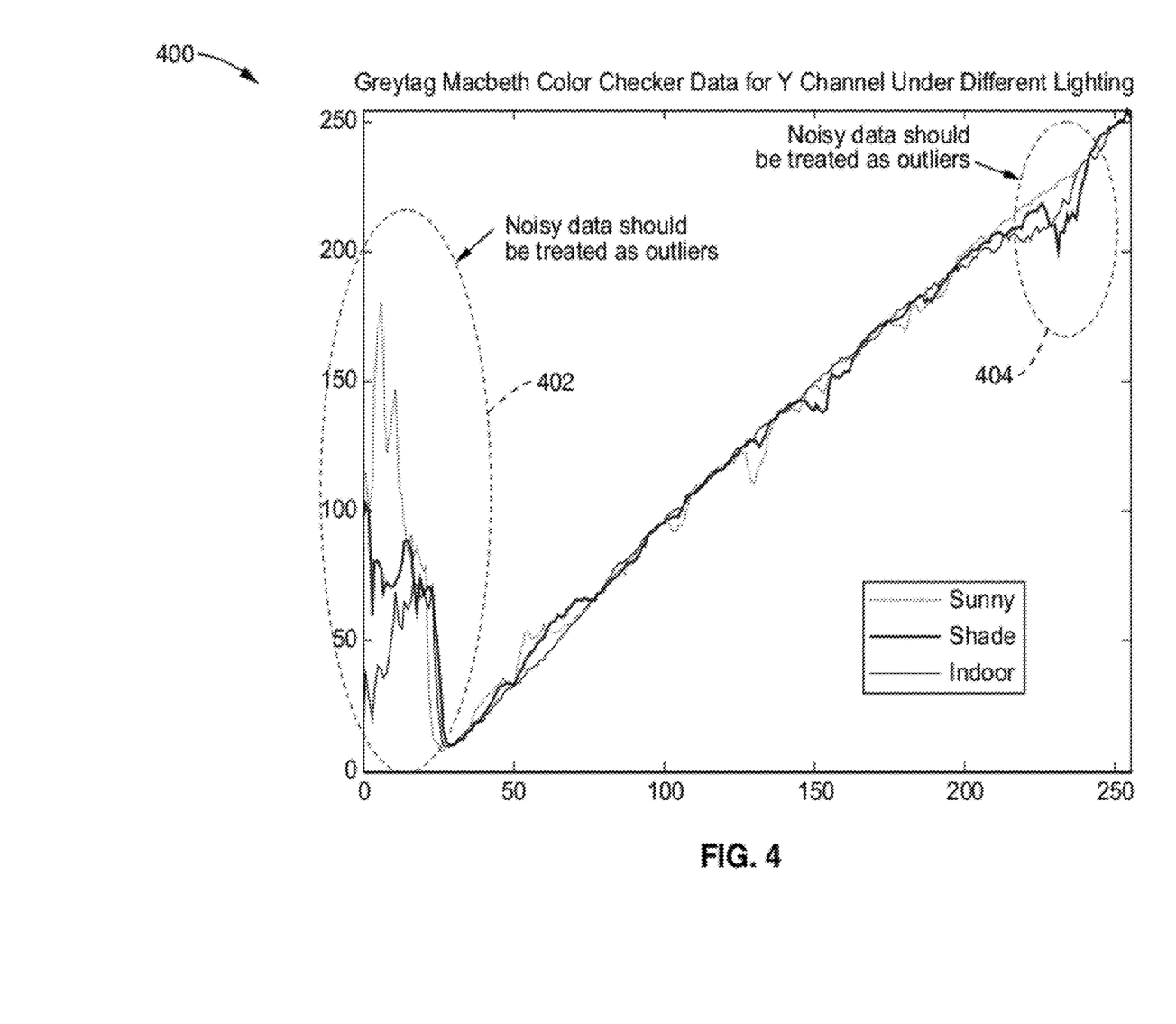
FIG. 4 is a plot of a Gretag Macbeth Color-Checker under different lighting conditions; an example of noisy outlier data in the very dark and bright area using the Y channel data.

Refer now to FIG. 4, which is an example of the plot of a Gretag Macbeth Color-Checker under different lighting conditions 400. It should be noted that the mean-valued mapped data in very dark 402 and very bright 404 regions are more sensitive to noise and interpolation errors, as circled in FIG. 4. These circled data should be treated as outliers and removed before forming the mapped function. This additional step is necessary to avoid uncontrollable mapping for incorrect color adjustment. Further additional end-data mapping points, mapping 0 to 0 and 255 to 255, are added prior to the polynomial fitting process to assure a meaningful mapping function result.

Polynomial Fit for the Nominal Mapping

Since the mean-value mapping function is not smooth and may not cover all values, polynomial fitting in a least a square sense is further applied to form the final nominal mapping function. This mapping function in general can be a 3rd-order polynomial to fit the "S-shape" relationship in a generic form as follows.

If necessary, piecewise mapping can ensure a more accurate nominal mapping function. But no more than three segments appear necessary.

As aforementioned, the nominal mapping functions are device dependent and perform as global color correction to bring the color tones of an input source image closer to the reference one. The polynomial mapping functions can be pre-determined and saved as look-up tables, or determined after acquisition of a source image and a reference image with near real-time processing.

2.2 Refinement

Since nominal mapping step is many-to-one mapping and each channel of YUV is processed independently, the resultant colors may not be accurate. The refinement step is therefore applied to match the color tone with all channels displayed together. Actually, this refinement step is more critical than the nominal mapping, which mainly prepares the data for better color correction in the refinement step.

After performing the nominal mapping for Y, U, and V channels individually, an intermediate image can be constructed from the intermediate values of Y, U, and V. This intermediate image may be placed in a 3×(n+1) matrix with the Y, U, and V values separately used as:

$$\begin{bmatrix} Y_0 & U_0 & V_0 \\ Y_1 & U_1 & V_1 \\ \vdots & \vdots & \vdots \\ Y_n & U_n & V_n \end{bmatrix}.$$

For each luminance value of Y in the intermediate image, two related sets of data may be determined: 1) the data from the intermediate image that shares the same Y value; and 2) the data of corresponding positions from the reference image. The associated mapping functions can be found by solving the following equations in the least square sense for color tone correction parameters $a_{i,j}$, where i ,j ∈ [Y, U, V]:

$$\begin{bmatrix} Y_{ref,0} \\ Y_{ref,1} \\ \vdots \\ Y_{ref,n} \end{bmatrix} = \begin{bmatrix} Y_0 & U_0 & V_0 \\ Y_1 & U_1 & V_1 \\ \vdots & \vdots & \vdots \\ Y_n & U_n & V_n \end{bmatrix}_{int} \begin{bmatrix} a_{YY} \\ a_{YU} \\ a_{YV} \end{bmatrix},$$

$$\begin{bmatrix} U_{ref,0} \\ U_{ref,1} \\ \vdots \\ U_{ref,n} \end{bmatrix} = \begin{bmatrix} Y_0 & U_0 & V_0 \\ Y_1 & U_1 & V_1 \\ \vdots & \vdots & \vdots \\ Y_n & U_n & V_n \end{bmatrix}_{int} \begin{bmatrix} a_{UY} \\ a_{UU} \\ a_{UV} \end{bmatrix}, \text{ and}$$

$$\begin{bmatrix} V_{ref,0} \\ V_{ref,1} \\ \vdots \\ V_{ref,n} \end{bmatrix} = \begin{bmatrix} Y_0 & U_0 & V_0 \\ Y_1 & U_1 & V_1 \\ \vdots & \vdots & \vdots \\ Y_n & U_n & V_n \end{bmatrix}_{int} \begin{bmatrix} a_{VY} \\ a_{VU} \\ a_{VV} \end{bmatrix},$$

where n+1 is the number of data points in the intermediate image, and the $Y_{ref,m}$, $U_{ref,m}$, and $V_{ref,m}$ refer to reference image pixels, numbering with the second index m ranging from 0 to n+1. The $Y_k$, $U_k$, and $V_k$ for k ∈ [0, n+1] represents the intermediate image pixel color tone values.

This system of equations may also be simultaneously solved in a combined forms as:

$$\begin{bmatrix} Y_0 & U_0 & V_0 \\ Y_1 & U_1 & V_1 \\ \vdots & \vdots & \vdots \\ Y_n & U_n & V_n \end{bmatrix}_{ref} = \begin{bmatrix} Y_0 & U_0 & V_0 \\ Y_1 & U_1 & V_1 \\ \vdots & \vdots & \vdots \\ Y_n & U_n & V_n \end{bmatrix}_{int} \begin{bmatrix} a_{YY} & a_{UY} & a_{VY} \\ a_{YU} & a_{UU} & a_{YU} \\ a_{YV} & a_{UV} & a_{VV} \end{bmatrix},$$

where int refers to the intermediate image, and ref refers to reference image pixels. The $Y_k$, $U_k$, and $V_k$ for both the int and ref images are indexed on k ∈ [0, n+1].

If the system is underdetermined, special handling is required. For example, if n=2 or the rank of coefficient matrix is 2, the Y value may be kept unchanged and thereby form a 2×2 matrix to solve for refinement parameters U and V. If n=1 or the rank of coefficient matrix is 1, there is no need for the refinement and the nominally mapped values are the final outputs.

At this point, the mapped output image may be formed by:

$$\begin{bmatrix} Y_0 & U_0 & V_0 \\ Y_1 & U_1 & V_1 \\ \vdots & \vdots & \vdots \\ Y_n & U_n & V_n \end{bmatrix}_{mapped} = \begin{bmatrix} Y_0 & U_0 & V_0 \\ Y_1 & U_1 & V_1 \\ \vdots & \vdots & \vdots \\ Y_n & U_n & V_n \end{bmatrix}_{int} \begin{bmatrix} a_{YY} & a_{UY} & a_{VY} \\ a_{YU} & a_{UU} & a_{YU} \\ a_{YV} & a_{UV} & a_{VV} \end{bmatrix},$$

using the same nomenclature as before where mapped refers to the mapped output image.

In addition, there is no need to provide all the associated data in the image to calculate the refinement parameters, $a_{ij}$. Only a subset of the data, which are within a range of nominal mapping value, are necessary for determining the refinement parameters. This not only reduces the calculation load, but also makes the system robust to noise.

Rounding Strategy

Still pictures may contain pixels with maximum value (max_val), e.g., max_val=255 for 8-bit data. In order to retain the mapped maximum value, the refinement output with the value greater than (max_val−1) will be set to the max_val. Others, rounding to the nearest integer will be processed for the final refinement output.

3. Alternative Methods

Other variations of the first step of the proposed method may be used, particularly in the case where the nominal mapping functions are not a priori determined or polynomial fittings are not available.

3.1 Alternative Method 1

The Cumulative Distribution Function (CDF) fit with polynomial fitting can also achieve a result similar to the one proposed for nominal mapping of the luminance Y channel. However, it is more computationally expensive.

In addition, CDF matching does not work well on chrominance channels U and V because the chrominance data values are more concentrated. However, they can still be mapped by modified mean-value mapping. Although mean-value mapping is not as accurate as nominal mapping, the overall result is almost the same as the result of proposed method. This is because the refinement stage is more critical and can handle the deviation between the two results. As a result, the mean-value mapping procedure appears as an alternative method as shown in FIG. 5.

Figure 5:
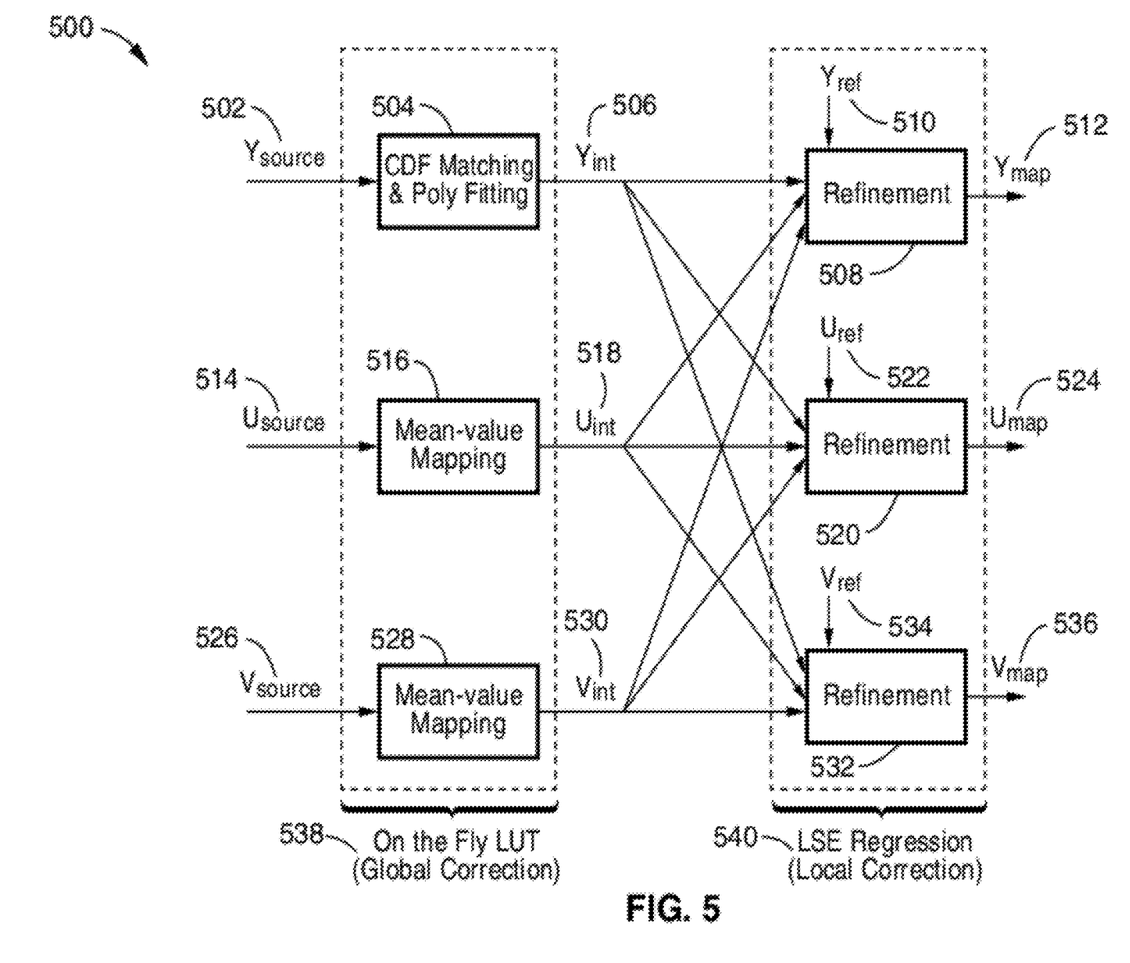
FIG. 5 is a flow chart showing an automatic color tone correction method for initial color correction using Cumulative Distribution Function (CDF) matching and polynomial mapping independently with pre-determined mapping functions.

Refer now to FIG. 5, which is a flow chart showing an automatic color tone correction method 500 for initial color correction using Cumulative Distribution Function (CDF) matching and polynomial mapping independently with pre-determined mapping functions. Here, the three color components from source image are first processed through CDF matching and polynomial mapping independently with pre-determined mapping functions. These intermediate data are then used as inputs for the refinement. Each final output channel is determined by all three channels to ensure the final colors appearance at the refinement stage.

In greater detail, the source luminance $Y_{source}$ 502 proceeds to a CDF matching and polynomial fitting process 504 to generate an intermediate luminance $Y_{int}$ 506 value. This value is in turn processed through a refinement stage 508 with a reference input luminance $Y_{ref}$ 510 to produce a mapped luminance $Y_{map}$ 512. The other inputs to the refinement step 508 will be deferred in the description at this time.

The source U value $U_{source}$ 514 proceeds to a mean-value mapping process 516 to generate an intermediate U value $U_{int}$ 518 value. This value is in turn processed through a refinement stage 520 with a reference input U value $U_{ref}$ 522 to produce a mapped U value $U_{map}$ 524. As above, other inputs to the refinement step 520 will be deferred in the description for a short time.

Finally, the source V value $V_{source}$ 526 proceeds to a mean-value mapping process 528 to generate an intermediate V value $V_{int}$ 530 value. This value is in turn processed through a refinement stage 532 with a reference input V value $V_{ref}$ 534 to produce a mapped V value $V_{map}$ 536.

As shown in FIG. 5, the first stage reflects on-the-fly LUT (global correction) 538 and the second stage reflects LSE regression (local correction) 540.

The description above merely described the processing of the $Y_{source}$ 502, $U_{source}$ 514, and $V_{source}$ 526 with no interaction with each other. Now, the interactions are added in the three refinement stages Y 508, U 520, and V 532.

The refinement stage 508 additionally inputs $U_{int}$ 518 and $V_{int}$ 530 in the formation of the $Y_{map}$ 512 output value.

Similarly, the refinement stage 520 additionally inputs $Y_{int}$ 506 and $V_{int}$ 530 in the formation of the $U_{map}$ 524 output value.

Finally, the refinement stage 532 additionally inputs $Y_{int}$ 506 and $U_{int}$ 518 in the formation of the $V_{map}$ 536 output value.

Cumulative Distribution Function (CDF) Matching

Standard CDF matching and histogram matching techniques both require iterative operations. Here normal CDF matching is modified by applying polynomial fittings to avoid the requirement of iterative operations and to ensure a continuous mapping.

The algorithm comprises: 1) adjusting the size of the source image equal to the same size as the reference image; 2) calculating the histograms of the source and the reference images; 3) determining the cumulative histograms for both images; 4) determining a mapping function between these two cumulative histograms; and 5) applying curve fitting to finalize the mapping function.

Figure 6:
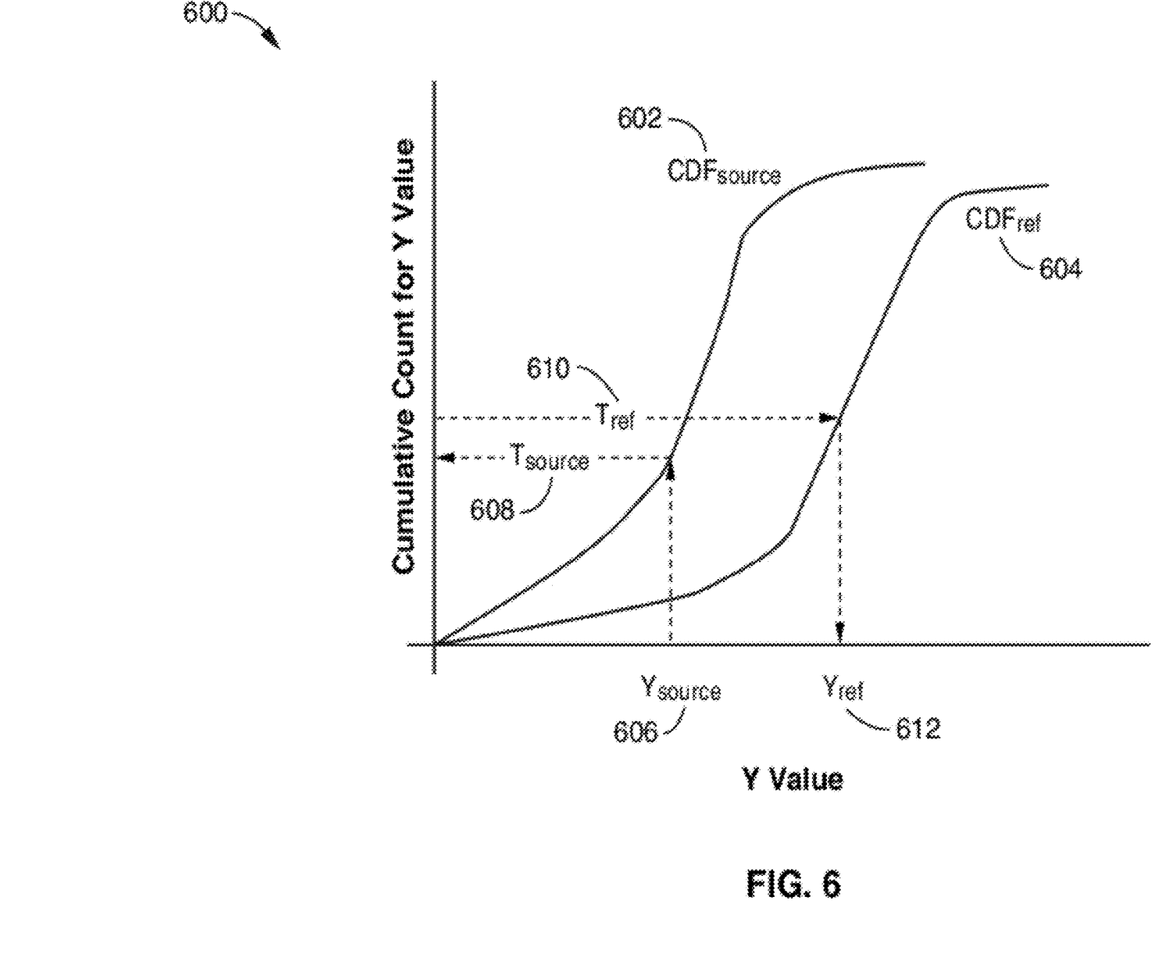
FIG. 6 is a graph of the Cumulative Distribution Function histogram curves for a source and a reference image.

Refer now to FIG. 6. FIG. 6 illustrates this mapping process 600. $CDF_{source}$ 602 and $CDF_{ref}$ 604 represent the cumulative histograms of the source and the reference images, respectively. For a particular color $Y_{source}$ 606 in $CDF_{source}$ 602, the cumulative count is $T_{source}$ 608. Locate $T_{ref}$ 610 from $CDF_{ref}$ 604, which has the closest value to $T_{source}$ 608 (this closest value is at an exaggerated distance on the graph 600 for clarity). The corresponding Y value, $Y_{ref}$ 612, will then be the mapped value of $Y_{source}$ 606. This process is repeated for all values of $CDF_{ref}$ 604 to determine a correspondence set between the $Y_{source}$ 606 and $Y_{ref}$ 612.

The next step comprises applying curve fitting to finalize the mapping function between the two correspondence sets $Y_{source}$ 606 and $Y_{ref}$ 612, while making the mapping continuous.

Figure 7:
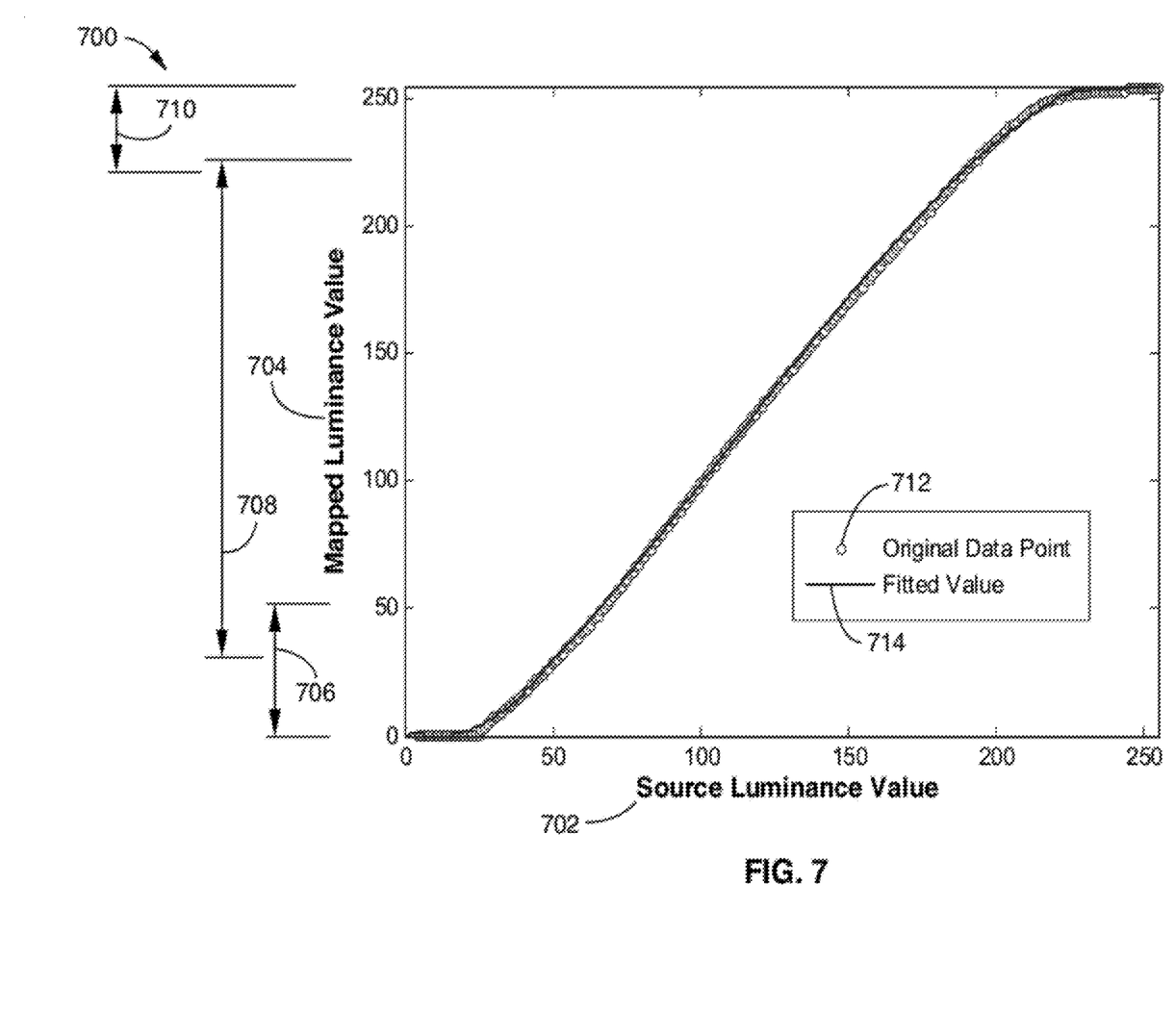
FIG. 7 is a graph of the third order (cubic) mapping polynomial that describes the relationship between the source luminance value and the mapped luminance value.

Refer now to FIG. 7, which shows a graphical example 700 of the mapping polynomial. Third order polynomials are used for piecewise fitting for an input source luminance value 702. The resulting mapping function for a particular segment has the general form of $Y_{int} = p_1 Y_{source}^3 + p_2 Y_{source}^2 + p_3 Y_{source} + p_4$, where $p_1$, $p_2$, $p_3$ and $p_4$ are cubic polynomial coefficients for that particular segment. The output of the mapping function is the mapped luminance value 704.

Each of the three cubic segments cover the ranges (source luminance values) of [0-50], [35-225], and [220-255], respectively in bands 706, 708, and 710 respectively (the mapped luminance values). The ranges overlap to ensure a smooth fit at the cubic transitions.

Instead of overlapping the ranges to ensure a smooth fit, cubic splines may be use to ensure a continuous smooth fit for the data.

The result of the cubic segment curve mapping is shown by an overlapping plot of the original data point 712 and the corresponding fitted value 714. In this FIG. 7, it appears that the results appear virtually identical.

Modified Mean-Value Mapping

The modified mean-value mapping is essentially the same method as previously proposed. However, since there is no cubic polynomial curve fit here, linear interpolations from neighboring data points are used to determine missing mapping points.

3.2 Alternative Method 2

Figure 8:
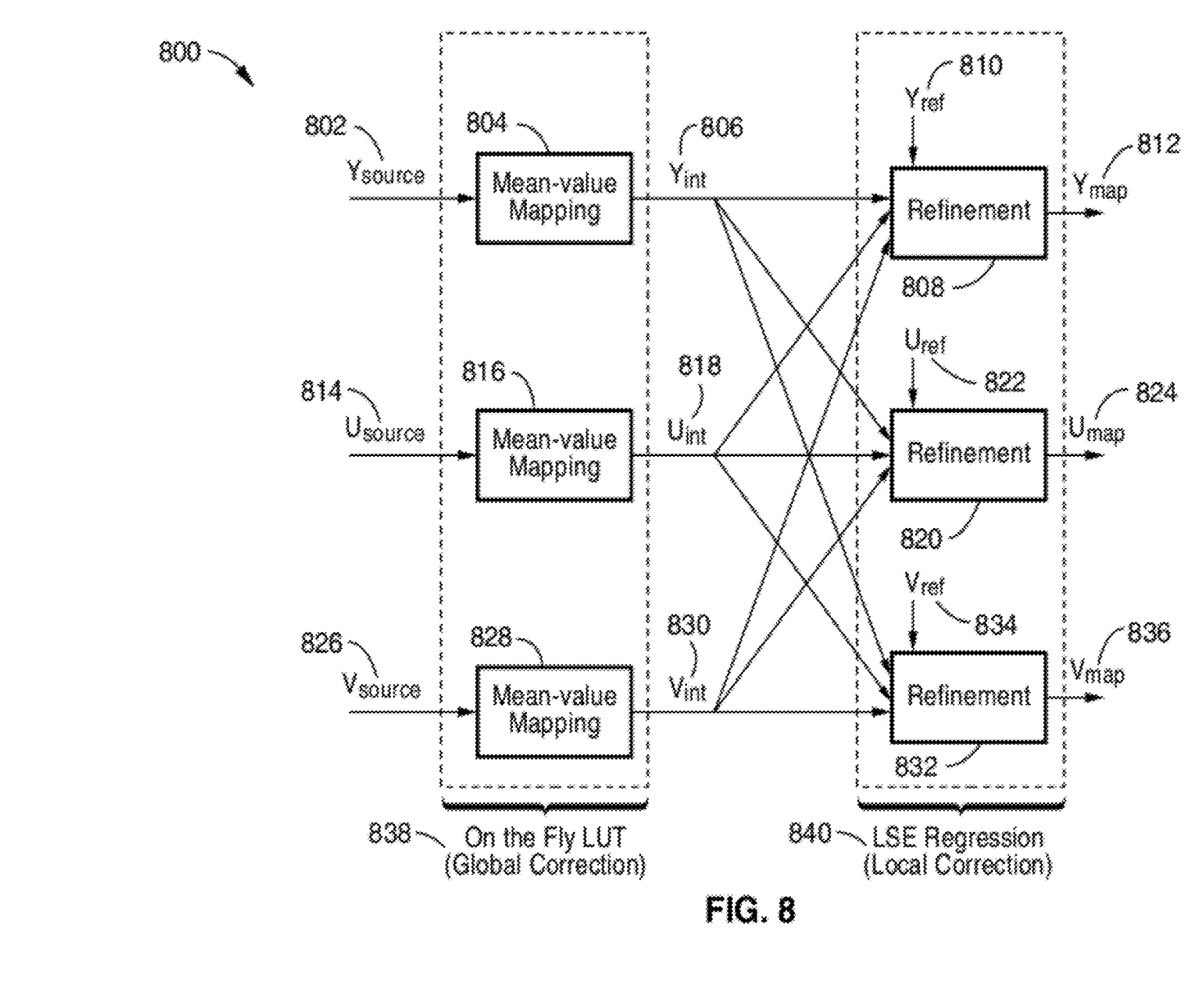
FIG. 8 is a flow chart showing an automatic color tone correction method for initial color correction using mean-value mapping.

When the nominal mapping functions are not available and the CDF matching with polynomial fitting on Y channel is not suitable, the modified mean-value mapping can be applied on all channels, as shown in FIG. 8.

Refer now to FIG. 8, which shows an automatic color tone correction method 800 for initial color correction using mean-value mapping. In FIG. 8, the three color components from source image are first processed through mean-value mapping independently without pre-determined mapping functions. These intermediate data are then used as inputs for the refinement. Each final output channel is determined by all three channels to ensure the final colors appearance at the refinement stage.

In greater detail, the source luminance $Y_{source}$ 802 proceeds to a mean-value mapping process 804 to generate an intermediate luminance $Y_{int}$ 806 value. This value is in turn processed through a refinement stage 808 with a reference input luminance $Y_{ref}$ 810 to produce a mapped luminance $Y_{map}$ 812. The other inputs to the refinement step 808 will be deferred in the description at this time.

The source U value $U_{source}$ 814 proceeds to a mean-value mapping process 816 to generate an intermediate U value $U_{int}$ 818 value. This value is in turn processed through a refinement stage 820 with a reference input U value $U_{ref}$ 822 to produce a mapped U value $U_{map}$ 824. As above, other inputs to the refinement step 820 will be deferred in the description for a short time.

Finally, the source V value $V_{source}$ 826 proceeds to a mean-value mapping process 828 to generate an intermediate V value $V_{int}$ 830 value. This value is in turn processed through a refinement stage 832 with a reference input V value $V_{ref}$ 834 to produce a mapped V value $V_{map}$ 836.

The description above merely described the processing of the $Y_{source}$ 802, $U_{source}$ 814, and $V_{source}$ 826 with no interaction with each other. Now, the interactions are added in the three refinement stages Y 808, U 820, and V 832.

The refinement stage 808 additionally inputs $U_{int}$ 818 and $V_{int}$ 830 in the formation of the $Y_{map}$ 812 output value.

Similarly, the refinement stage 820 additionally inputs $Y_{int}$ 806 and $V_{int}$ 830 in the formation of the $U_{map}$ 824 output value.

Finally, the refinement stage 832 additionally inputs $Y_{int}$ 806 and $U_{int}$ 818 in the formation of the $V_{map}$ 836 output value.

As shown in FIG. 8, the first stage reflects on-the-fly LUT (global correction) 838 and the second stage reflects LSE regression (local correction) 840.

4.0 Implementation Overview

Backing up now for the details of automatic image color tone correction, now look at overall implementations of the method.

Figure 9A:
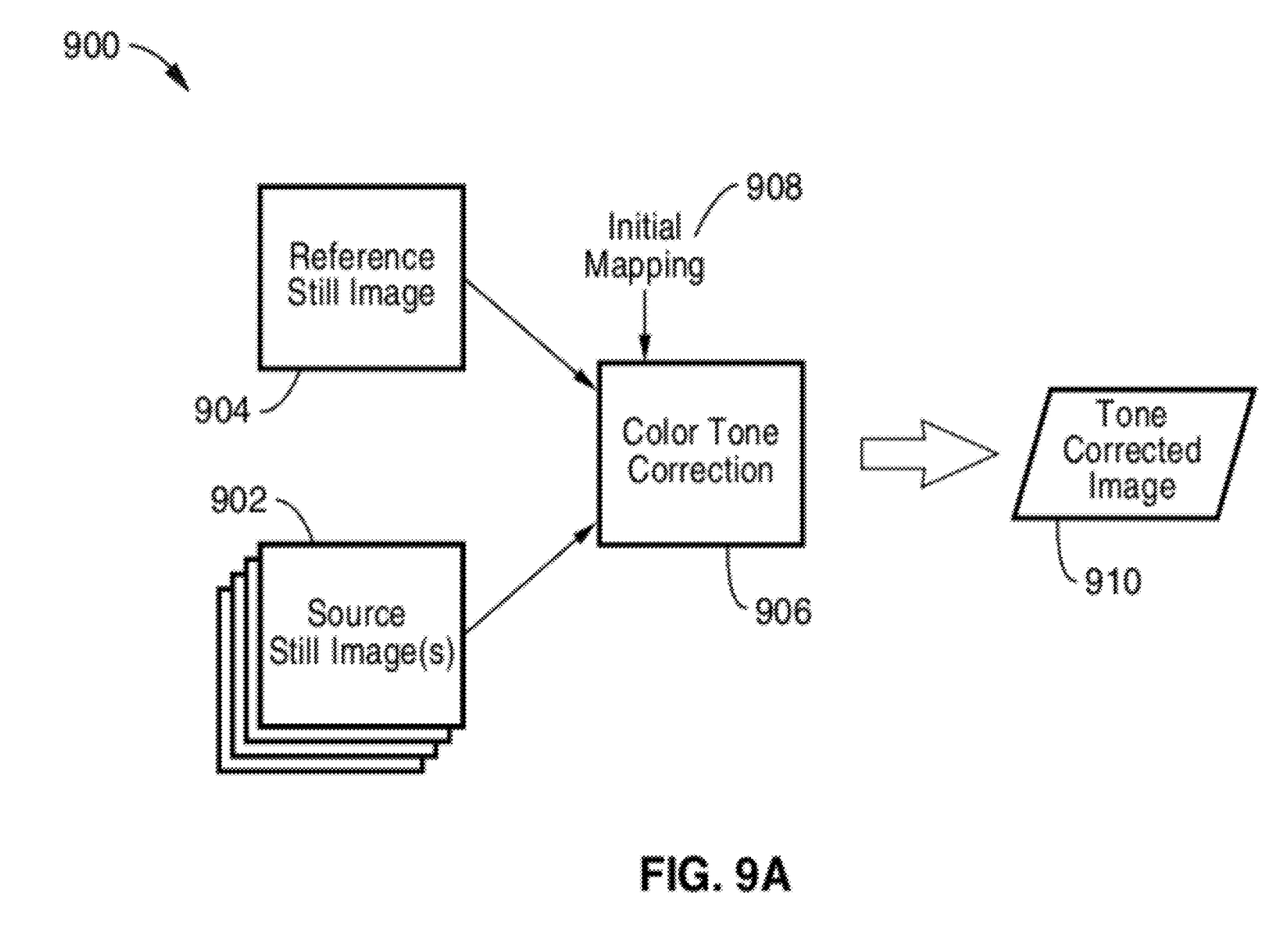
FIG. 9A is a flow chart of the automatic color tone correction method, with input source image(s) and a reference still image producing a tone corrected image.

Refer now to FIG. 9A, which is a flow chart of the overall color tone correction method 900. Here, one or more source images 902, as well as at least one reference image 904 (preferably a still image, that has highest color tone quality) are input into the color tone correction method 906 of this application. An initial mapping 908 may or may not be used as an input to produce a tone corrected output 910.

Figure 9B:
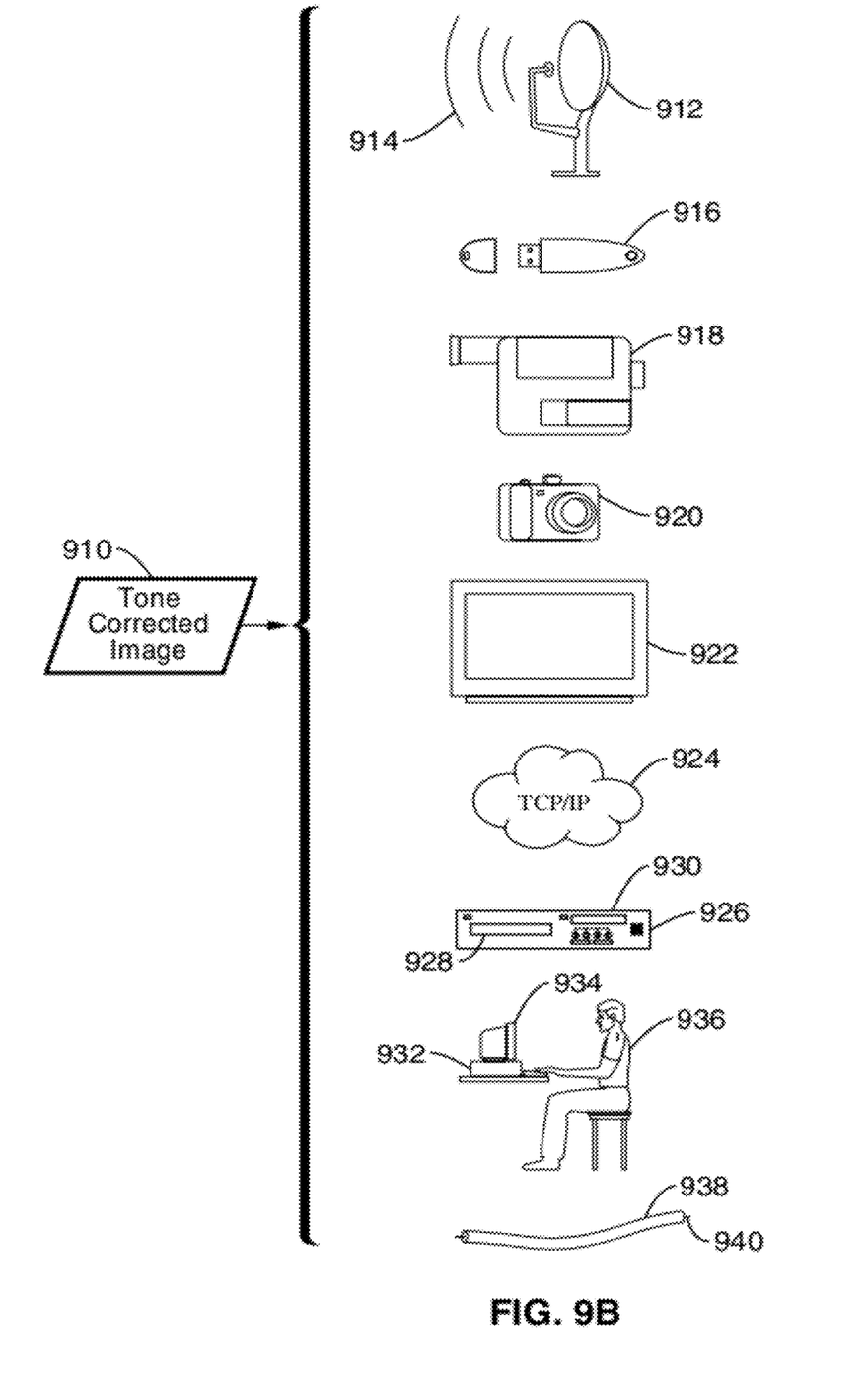
FIG. 9B is a chart showing the various computer readable media to which the color tone corrected image may be output.

Refer now to FIG. 9B, which is a diagram of the various computer readable media to which the tone corrected image 910 may be output. It may be sent to a microwave transmitter 912 for propagation through microwaves 914 to a distant connection. The tone corrected image 910 may be stored on a memory device faster or slower than the depicted USB storage device 916, as well as stored on a digital or analog recording medium exemplified as a high definition video recorder 918, or a still or moving digital camera 920. Similarly, the tone corrected image 910 may be displayed, with or without further processing, on a graphical device such as a plasma or liquid crystal display 922. The tone corrected image 910 may be transmitted through a network 924, which may be wireless, or may use TCP/IP or other interconnection techniques to any other device in this FIG. 9B. Still another output of the tone corrected image 910 may be output to a multiple media device 926, which may have a VHS video recorder 928, or a DVD recorder 930. Yet another output of the tone corrected image 910 may be to a computer 932 that may or may not be connected to a display device 934, to be ultimately viewed by a person 936. The computer 932 may itself have a wide variety of computer readable media available for subsequent secondary output of the tone corrected image 910. Finally, the tone corrected image 910 may be transmitted through a wired connection 938, which may have one or more conductors 940 of electromagnetic information, ultimately being transmitted to one or more of the devices present in this FIG. 9B.

Conclusion

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A system for image color tone correction, comprising:
a computer processor;
programming executable on said computer processor for carrying out steps comprising:
providing a reference image and one or more source images, wherein all images are comprised of pixels of a scene;
correcting a designated portion of one of the source images based on the reference image to create a color tone corrected image; and
outputting the color tone corrected image to a computer readable medium.

2. The system of claim 1, wherein the correcting step comprises:
forming an intermediate image from the designated portion of one of the source images using a global correction in a YUV color space; and
refining the intermediate image into the color tone corrected image.

3. The system of claim 2, wherein the forming the intermediate image step comprises:
mapping a source pixel Y value, $Y_{source}$, from the designated portion of one of the source images, to an intermediate Y value, $Y_{int}$, in the intermediate image;
mapping a source U pixel value, $U_{source}$, from the source image to be corrected, to an intermediate pixel U value, $U_{int}$, in the intermediate image; and
mapping a source pixel V value, $V_{source}$, from the source image to be corrected, to an intermediate pixel V value, $V_{int}$, in the intermediate image.

4. The system of claim 3, wherein the mapping of the source image pixel YUV value to the intermediate image pixel YUV value comprises:
providing independent Y, U, and V look up tables (LUTs) that allow mapping of a source pixel YUV value, ($Y_{source}$, $U_{source}$, $V_{source}$), from the designated portion of one of the source images, to a corresponding intermediate pixel YUV value, ($Y_{int}$, $U_{int}$, $V_{int}$), in the intermediate image;
wherein the independent Y, U, and V look up tables (LUTs) are comprised of nominal mapping values.

5. The system of claim 4, wherein the independent Y, U, and V look up tables (LUTs) are generated off-line, without involvement of the reference image or the one or more source images.

6. The system of claim 4, wherein each of the independent Y, U, and V look up tables (LUTs) represents a mapping between: a first set of processing parameters for the reference image, and a second set of processing parameters for the one or more source images.

7. The system of claim 3, wherein the mapping of the source pixel YUV value to the intermediate YUV value comprises:
calculating independent Y, U, and V look up tables (LUTs) that map the source pixel YUV value, ($Y_{source}$, $U_{source}$, $V_{source}$), from the source image to be corrected, to a corresponding intermediate pixel YUV value, ($Y_{int}$, $U_{int}$, $V_{int}$);
wherein the independent Y look up table (LUT) comprises a curve fitted Cumulative Distribution Function (CDF) based on histograms of the source image and the reference image; and
wherein the independent U, and V look up tables (LUTs) are comprised of mean-value mapping values.

8. The system of claim 7, wherein the curve fitted Cumulative Distribution Function (CDF) is curve fit with a cubic polynomial for a low, mid, and high range of data.

9. The system of claim 8, wherein the three cubic polynomials are cubic splines.

10. The system of claim 8, wherein the curve fit excludes noisy outlier data.

11. The system of claim 3, wherein the mapping of the source pixel YUV value to the intermediate YUV value comprises:
calculating independent Y, U, and V look up tables (LUTs) that map the source pixel YUV value, ($Y_{source}$, $U_{source}$, $V_{source}$), from the source image to be corrected, to a corresponding intermediate pixel YUV value, ($Y_{int}$, $U_{int}$, $V_{int}$);

wherein the independent Y, U, and V look up tables (LUTs) are comprised of mean-value mapping value based on the designated portion of one of the source images, and a corresponding designated portion of the reference image.

12. The system of claim 2, wherein the step of refining the intermediate image into the color tone corrected image comprises:

matching a color tone of the intermediate image to a color tone of the reference image;

wherein the color tone of the intermediate image is comprised of the Y, U, and V values of the pixels of the intermediate image; and wherein the color tone of the reference image is comprised of the Y, U, and V values of the pixels of the reference image.

13. The system of claim 12, wherein the matching the color tone of the intermediate image to the color tone of the reference image step comprises:

regressing the color tone of the intermediate image with the color tone of the reference image to form color tone correction parameters $a_{i,j}$, where i ,j ∈ [Y, U, V];

wherein the regressing step minimizes a least squares error; and applying the color tone correction parameters $a_{i,j}$ to the intermediate image to form the color tone corrected image.

14. The system of claim 13, wherein the regressing step comprises:

using a subset of the reference image color tone and a corresponding subset of the intermediate image to form color tone correction parameters $a_{i,j}$, where i ,j ∈ [Y, U, V];

whereby the computational loading for calculating the color tone correction parameters $a_{i,j}$ is substantially reduced.

15. The system of claim 14, wherein the subset of the reference image color tone and the subset of the intermediate image comprises an interlaced subset.

16. The system of claim 13, comprising applying the color tone correction parameters $a_{i,j}$ to the intermediate images of the remainder of the source images from the same scene to form the color tone corrected images.

17. The system of claim 1, further comprising:

a computer readable medium comprising the programming executable capable of performing on the computer.

18. The system of claim 1, wherein the system comprises an image color tone correction apparatus.

19. The system of claim 18, wherein the image color tone correction apparatus may be hand held.

20. A system for image color tone correction, comprising:

a computer processor;

programming executable on said computer processor for carrying out steps comprising:

acquiring a still reference image of a scene, wherein the still reference image is comprised of pixels;

acquiring one or more source images of the scene, wherein the source images are comprised of pixels;

correcting a designated portion of one of the source images based on a corresponding portion of the reference image to create a color tone corrected image; and outputting the color tone corrected image to a computer readable medium.

21. The system of image claim 20, comprising:

detecting a change in the scene; and after detecting the change in the scene, acquiring a new reference image to replace the reference image.

22. The system of claim 20, further comprising:

a computer readable medium comprising the programming executable capable of performing on the computer.

* * * * *